United States Patent [19]
Morikami

[11] Patent Number: 6,116,971
[45] Date of Patent: Sep. 12, 2000

[54] ALARM DEVICE OF OUTBOARD MOTOR

[75] Inventor: Tadaaki Morikami, Hamamatsu, Japan

[73] Assignee: Suzuki Kabushiki Kaisha, Hamamatsu, Japan

[21] Appl. No.: 09/174,911

[22] Filed: Oct. 19, 1998

[30] Foreign Application Priority Data

Oct. 20, 1997 [JP] Japan ................................. 9-287214

[51] Int. Cl.$^7$ ................................................ B63H 20/00
[52] U.S. Cl. .............................................. 440/2; 340/984
[58] Field of Search ............................ 440/1, 2; 340/984

[56] References Cited

U.S. PATENT DOCUMENTS

| | | | |
|---|---|---|---|
| 4,019,489 | 4/1977 | Cartmill | 440/1 |
| 4,562,801 | 1/1986 | Koike | 123/196 S |
| 4,914,419 | 4/1990 | Bragenzer et al. | 340/459 |
| 4,940,965 | 7/1990 | Umehara | 340/460 |
| 5,016,006 | 5/1991 | Umehara | 440/2 |
| 5,020,492 | 6/1991 | Kanno | 123/198 D |

*Primary Examiner*—Sherman Basinger
*Attorney, Agent, or Firm*—Finnegan, Henderson, Farabow, Garrett & Dunner, L.L.P.

[57] ABSTRACT

An alarm device of an outboard motor arranged in operative association with an engine thereof to which a sensor device including a plurality of sensors is mounted and operated by a control power source, comprises a central control device into which an operation condition of the engine is inputted, a sensor trouble judging device connected to the central control device and the sensor device for judging a state of trouble of the sensor device, an alarm control device, a sound alarm device controlled by the alarm control device, and an alarm judging device for judging a type of an alarm, which is connected to the alarm control device so as to operate the alarm control device to operate the sound alarm device in response to an information from the sensor trouble judging device. The alarm judging device includes an engine rotational speed detection element into which a predetermined engine rotational speed is preliminarily stored and a sound mode setting element to set a sound mode of the sound alarm device to a diagnosis mode when an engine rotational speed is less than a predetermined rotational speed and to set the sound mode to a warning alarm mode when the engine rotational speed exceeds the predetermined rotational speed with sound tones of the sound alarm device different in the diagnosis mode and the warning alarm mode, respectively.

8 Claims, 5 Drawing Sheets

ALARM DEVICE OF OUTBOARD MOTOR

BACKGROUND OF THE INVENTION

1. Field of the Invention

The present invention relates to an alarm device of an outboard motor, which makes an operator, maneuvering a boat or the like to which the outboard motor is mounted, recognize troubles or problems indicated by various types of sensors mounted on an engine of the outboard motor.

2. Background of the Related Art

In a middle sized or large sized outboard motor, such an alarm device is mounted to the outboard motor for allowing an operator to recognize various kinds of problems or abnormalities indicated by different sensors. When a particular type of trouble or problem occurs, the condition of the trouble can be recognized through a display of such as LED (light emitting diode) or the like provided to an instrument board.

Further, in a case of a small sized motor or the like in which such an alarm device is not provided, troubles indicated by the sensors have been recognized by periodically inspecting the diagnosis data (i.e., the trouble diagnosing output) outputted from a control device of the engine by a tester.

However, even with an outboard motor having an alarm device, a trouble alarm is indicated only by a visual display means such as the LED. Therefore, there is a possibility that the operator may not notice the displayed alarm. Furthermore, the operator may generally neglect the periodical inspection of the diagnosis data by a tester. Accordingly, outboard motors have been driven while remaining in trouble, resulting in decreased fuel consumption, diminished boat maneuverability, or even damage to the engine itself, for example.

SUMMARY OF THE INVENTION

An object of the present invention is to substantially eliminate defects or drawbacks encountered in the prior art mentioned above and to provide an alarm device of an outboard motor to reliably alert an operator of troubles indicated by one or more sensors mounted to an engine of the outboard motor to an operator maneuvering a boat or the like to which the outboard motor is mounted and to quickly and properly deal with the trouble.

Another object of the present invention is to provide an alarm device of an outboard motor capable of making the operator again recognize the trouble in a case where the outboard motor is used with the sensors remaining in an out of order condition.

A further object of the present invention is to provide an alarm device of an outboard motor capable of resetting the data of the trouble without requiring any special operation after the one or more sensors have been repaired.

These and other exemplary objects can be achieved according to the present invention by providing, in one aspect, an alarm device of an outboard motor arranged in operative association with an engine of the outboard motor to which a sensor device including a plurality of sensors is mounted and operated by a control power source, the alarm device comprising:

a central control device into which an operation condition of the engine is inputted;

a sensor trouble judging device operatively connected to the central control device and the sensor device for judging a state of trouble of the sensor device;

an alarm control device;

a sound alarm device controlled by the alarm control device; and an alarm judging device for judging a kind of an alarm, which is operatively connected to the alarm control device so as to operate the alarm control device to operate the sound alarm device in response to an information from the sensor trouble judging device at a time when the sensor device becomes out of order; and wherein the alarm judging device includes an engine rotational speed detection element into which a predetermined engine rotational speed is preliminarily stored and a sound mode setting element to set a sound mode for the sound alarm means to a diagnosis mode when an engine rotational speed is less than a predetermined rotational speed and to set the sound mode to a warning alarm mode when the engine rotational speed exceeds the predetermined rotational speed with sound tones of the sound alarm device different in the diagnosis mode and the warning alarm mode, respectively.

In a preferred embodiment, a tone changing device is further disposed, which is operated to select a tone of a sound generated by the sound alarm device according to a kind of sensors now in trouble when the sound alarm device is operated in the diagnosis mode. The tone changing device may be included in the sensor trouble judging device.

A memory device is operatively connected to the sensor trouble judging device for storing trouble data of the sensor device and a read-out device operatively connected to the memory device for reading out the trouble data stored in the memory device at a time when the control power source is operated again, at least the sound alarm device in the sound alarm device and display alarm device being operated in response to an information from the read-out device. A deletion device may be further disposed for deleting the trouble data stored in the memory device at a time when the engine is started again.

The alarm control device is included in the alarm judging device and a reset device is operatively connected to the alarm judging device for operating the alarm control device.

A display alarm device such as light emitting diode may be further disposed so as to be simultaneously operated with the sound alarm device such as buzzer.

In another aspect of the present invention, there is provided an alarm device of an outboard motor arranged in operative association with an engine of the outboard motor to which a sensor means including a plurality of sensors is mounted and operated by means of a control power source, the alarm device comprising:

a central control means into which an operation condition of the engine is inputted;

a sensor trouble judging means operatively connected to the central control means and the sensor means for judging a state of trouble of the sensor means;

an alarm control means including two kinds of control elements operatively independent from each other;

a sound alarm means and a display alarm means which are controlled independently by the two control elements, respectively; and an alarm judging means for judging a kind of an alarm, which is operatively connected to the alarm control means so as to operate the alarm control means to simultaneously operate the sound alarm means and display alarm means in response to an information from the sensor trouble judging means at a time when the sensor means becomes out of order; and wherein the alarm judging means includes an engine rotational speed detection element into which a predetermined engine rotational speed is preliminarily stored and a sound mode setting element to set a sound mode of the sound alarm means to a diagnosis mode with a small loudness when an engine rotational speed is less than a predetermined rotational speed and to set the sound mode to a warning alarm mode with a large loudness when the engine rotational speed exceeds the predetermined rotational speed at the time when the sound alarm means and the display alarm means are simultaneously operated.

According to the alarm device of the present invention mentioned above, the diagnosis mode and the warning alarm mode can be recognized by the operator without changing the sound loudness of the sound alarm means such as buzzer, so that it is not necessary to increase, i.e. increase the loudness of the sound alarm loudness level, thus giving no inconvenience in feeling to the operator by the changing of the sound loudness as well as the precise recognition of the trouble of the engine sensor.

According to the alarm device of the embodiment of this invention, since the tone changing means selects the tone of the sound alarm means according to the kind of the sensor now in trouble when the sensor breaks down, the operator can recognize the kind of the sensor now in trouble at once, and can quickly and properly deal with the trouble.

Furthermore, according to the alarm device of the present embodiment, even if the control power source is once cut off when the sensor breaks down, the memory means stores the trouble data, and the read-out means reads out the stored trouble data at the same time that the control power source is again operated, and at least the sound alarm means is operated, so that the operator can recognize the trouble again, in a case where the outboard motor is used again with the sensor being left in trouble.

Furthermore, according to the alarm device of this embodiment, although the trouble data is stored in the memory means, the trouble data is deleted by the deletion means at the same time that the engine is started again, and therefore, the reset of the trouble data can be performed without requiring any special operation after the finish of the repair of the sensors in trouble.

According to the alarm device of the present invention mentioned above, when the sensor of an outboard motor breaks down, the sensor trouble judging means judges the state of the trouble and inputs this state into the alarm judging means. The alarm judging means operates simultaneously the sound alarm means and the display alarm means through different systems of alarm control means. The sound mode of the sound alarm means at this moment is set to the diagnosis mode having a small loudness if the engine rotational speed is below the predetermined rotational speed at which the noise becomes large, and the mode is set to the alarming mode having a large loudness if the engine rotational speed exceeds the predetermined rotational speed at which the noise becomes large.

Thus, since the sound alarm means and the display alarm means operate at the same time, the trouble of the sensor can surely be recognized by an operator of an outboard motor. Furthermore, since the loudness of the sound alarm means becomes large when the engine noise is large, the trouble can be recognized more surely. In this case, even if the display alarm means is in trouble, it can be judged at once whether the alarm is a warning alarm of the engine itself or a trouble alarm of the sensor, by lowering the engine rotational speed.

Furthermore, the sound alarm means and the display alarm means are respectively controlled by the different of alarm control means, respectively, and therefore, even if either one of the alarm means or the alarm control means should breaks down, an alarm is issued by the other, so that the alarm can be recognized.

The nature and further characteristic features of the present invention will be made more clear from the following descriptions made with reference to the accompanying drawings.

DESCRIPTION OF THE PREFERRED EMBODIMENT

One embodiment of the present invention will be described hereunder with reference to the drawings.

Figure 1:
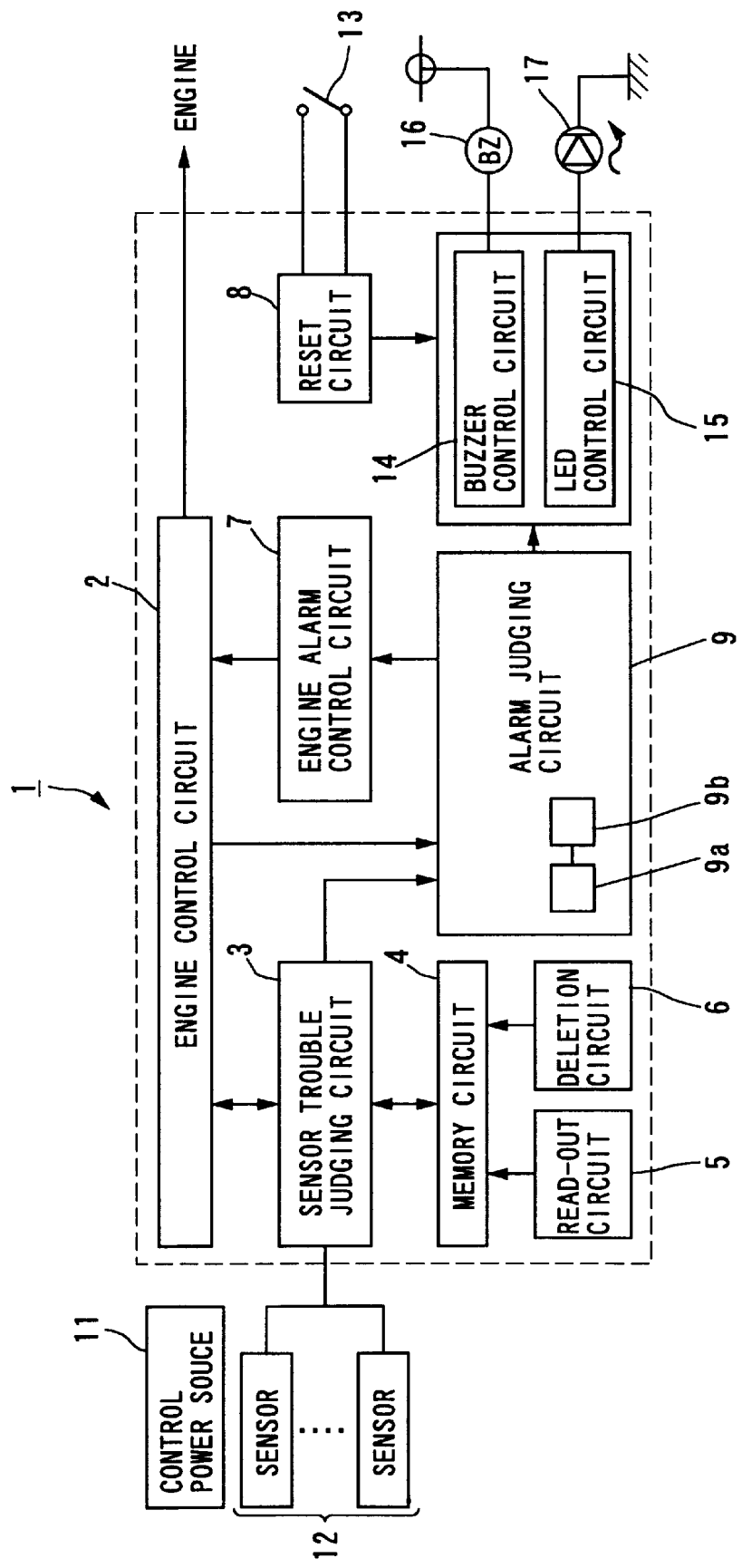
FIG. 1 is a block diagram showing a structural arrangement of an alarm device of an outboard motor according to the present invention.

Referring to FIG. 1 showing the structural diagram of an alarm device 1 of the present invention. This alarm device 1 is equipped with an engine control circuit 2, such as a CPU or a microcomputer, for performing an ignition control, fuel injection control or the like essential for the operation of an engine of an outboard motor, a sensor trouble judging (discriminating) circuit 3, a memory circuit 4, a read-out circuit 5, a deleting circuit 6, an engine alarm control circuit 7, a reset circuit 8, and an alarm (warning) judging circuit 9, which are mutually operatively connected.

In addition to this alarm device 1, a control power source 11, such as a battery or a generator for supplying the total power source, is connected, and further, various kinds of sensors 12 mounted on the engine, for example, an engine temperature sensor, an intake air temperature sensor, a boost sensor, and an idling switch are also connected to the alarm device 1.

Further, a reset switch 13 is connected to the reset circuit 8. A buzzer control circuit 14 and an LED control circuit 15 are provided for the alarm judging circuit 9 in parallel to each other, and a buzzer 16 and an LED 17 are respectively connected to the buzzer control circuit 14 and to the LED control circuit 15, so that the buzzer 16 and the LED 17 can be independently controlled by the different series of control circuits 14 and 15. These control circuits 14 and 15 are incorporated in the alarm judging circuit 9 or disposed independently in association therewith.

Figure 2:
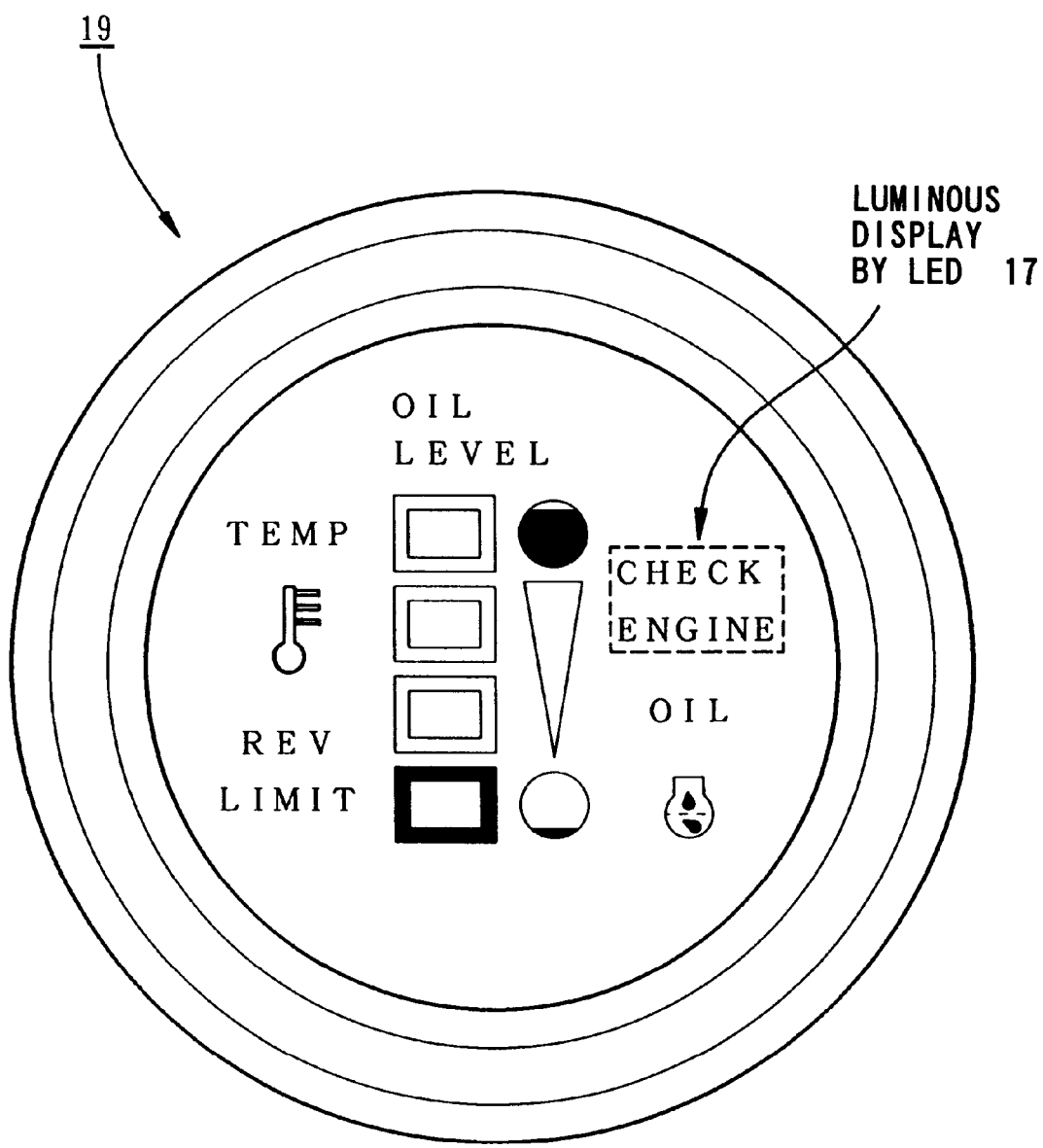
FIG. 2 is a front view of a monitor gage provided to an instrument board of an outboard motor.

The LED 17 is arranged so as to illuminate on a luminous display, when turned on, for example, with the letters "CHECK ENGINE" in a monitor gage 19 provided on an instrument board of an outboard motor as shown in FIG. 2. Furthermore, the reset switch 13 and the buzzer 16 are also arranged around the instrument board.

In this alarm device 1, operational conditions or states of the engine are set to be controlled, and the control circuit 2 operates commonly as a central control means for the alarm device 1 of this embodiment. The sensor trouble judging circuit 3 functions as the sensor trouble judging means, and the alarm judging circuit 9 functions as the alarm type judging means. Furthermore, the buzzer control circuit 14 and the LED control circuit 15 function as the alarm control means, and the buzzer 16 and the LED 17 respectively function as the sound alarm means and the display alarm means. Further, the sensor trouble judging circuit 3 may also have a function as a tone changing means.

In the alarm judging circuit 9, there is arranged an engine rotational speed detecting element 9a into which a predetermined engine rotational speed a is preliminarily stored and the detected engine rotational speed N is compared with the predetermined engine rotational speed $\alpha$ and there is also arranged a sound mode setting element 9b for setting an alarm sound mode.

The alarm device 1 of the structure mentioned above will operate or function as follows.

First, when any one or more of the sensor(s) 12, which are provided on an engine of the outboard motor, break down or change state, the sensor trouble judging circuit 3 discriminates or judges the state of the trouble and inputs data into the alarm judging circuit 9 accordingly. The alarm judging circuit 9 drives the buzzer control circuit 14 and the LED control circuit 15 to thereby simultaneously operate the buzzer 16 and the LED 17 to make an operator of the outboard motor recognize the trouble by producing the sound with the buzzer 16 and the display of the letters "CHECK ENGINE" in the monitor gage 19 with the light emitting of the LED 17.

The sound mode of the buzzer 16 at this time is set to a diagnosis mode for emitting sound of a small loudness level when the engine rotational speed N is below the predetermined rotational speed $\alpha$ and an alarming mode and a warning mode, which provides a warning alarm for emitting sound of a large loudness level when the engine rotational speed N exceeds the rotational speed $\alpha$, based on control signals received from the alarm judging circuit 9. The sound level in the warning alarm mode is different from an alarming sound level which is issued at a time when the engine itself breaks down or at a time when the engine rotational speed becomes excessive.

The sound level in the alarming modes, which is relatively a large loudness level, is automatically returned to the sound level of the diagnosis mode, which is a relatively small loudness level, at a time when the operator closes a throttle of the outboard motor engine, to thereby make the engine rotational speed N less than the predetermined rotational speed $\alpha$. Furthermore, when the operator recognizes the trouble and operates the reset switch 13, the reset circuit 8 acts on the buzzer control circuit 14 to stop the operation of the buzzer 16. In such a manner, it becomes possible to continue the operation of the outboard motor without continuously generating the sound of the buzzer 16 after the troubles of the sensor(s) 12 have been recognized by the operator.

As mentioned above, when the troubles of the sensor(s) 12 arise, since the buzzer 16 and the LED 17 simultaneously operate, the trouble or abnormality indicated by the one or more sensor(s) 12 can be readily recognized by the operator. Furthermore, when the engine noise is large, the loudness of the buzzer 16 also becomes large, so that the trouble can be recognized more reliably. Additionally, even if the LED 17 is out of order, an operator can determine whether the alarm is a warning alarm concerning the engine itself or an alarm concerning the troubles of the sensor(s) by lowering the engine rotational speed N.

Moreover, since the buzzer 16 and the LED 17 are independently controlled, respectively, by the different series of the control circuits 14 and 15, even if either one of the buzzer 16 or the LED 17, or either one of the control circuits 14 or 15 should break down, the alarm is issued by the other one thereof, so that the operator can reliably recognize the type of alarm.

Figure 3A:
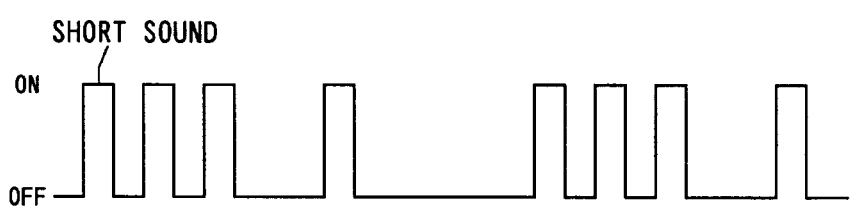
FIGS. 3A, 3B and 3C are time charts for explaining the operation of the alarm device of the present invention.
Figure 3B:
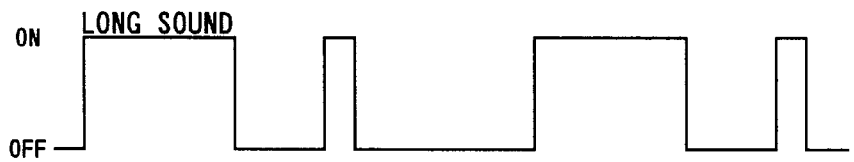

Further, in a case where the buzzer 16 operates in the diagnosis mode, the sensor trouble judging circuit 3 is programmed so as to select the tone of the buzzer 16 according to the type of sensor(s) 12 that are placed in an out of order state. The selection of the tone is performed, for example, by changing code sounds in combination with short and long sounds like the Morse signals as shown in FIGS. 3A and 3B. For example, when a certain sensor breaks down, one cycle of a code sound pattern may be selected such that a short sound pulse is generated three times and then one time after an interval as shown in FIG. 3A. On the other hand, when a different sensor breaks down, another cycle of a code sound pattern may be selected such that a long sound pulse is generated one time and then a short sound pulse is generated one time after an interval. In this manner, different or specified code sound patterns are predetermined for each of the sensors, respectively. Therefore, the operator can recognize at once the type of sensor(s) 12 that is out of order so as to quickly and properly deal with the trouble even if he is on a boat or the like. Furthermore, in a case where it is necessary to contact a service or maintenance section (e.g., a service person) at a remote location to obtain advice for rendering a particular trouble state, such advice may be facilitated by transmitting the code sound pattern of the particular trouble through, for example, a telephone or other communication device.

The sound mode of the buzzer 16 at the time of the trouble of the sensor 12 is set in the sound mode setting means 9b and adjusted to the diagnosis mode at the time when the engine rotational speed N is below the predetermined rotational speed $\alpha$ at which the engine rotation sound becomes large, and on the contrary, to the warning alarm mode at the time when the engine rotational speed N exceeds the predetermined rotational speed $\alpha$. At this time, according to an exemplary embodiment of present invention, it is possible to recognize the type of sensor trouble not only by changing the sound loudness level through the diagnosis mode or warning alarm mode, but also by changing the tone of the sound itself.

Figure 3C:
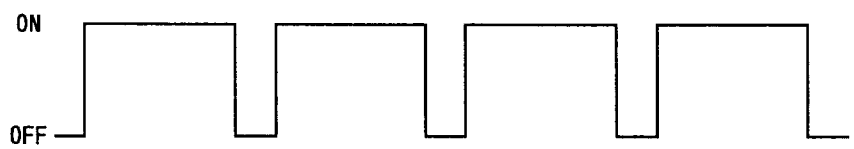

That is, with reference to FIG. 3C, the sound tone or pulse pattern of the buzzer 16 in the warning alarm mode may be made as a long sound pulse having a predetermined interval to clearly distinguish it from the code sounds in the diagnosis mode as shown in FIGS. 3A and 3B. Therefore, it is possible for an operator to recognize the diagnosis mode and the warning alarm mode independently without having to change the sound loudness level of the buzzer 16.

On the other hand, when the sensor 12 breaks down, the trouble data thereof is stored in the memory circuit 4. The stored data is read out by the read-out circuit 5 at the same time the power source 11 is restored or again operated, e.g., alternatively referred to as power restoration, even if the use of the outboard motor is completed when one or more sensor(s) 12 remains in the out of order state, and the control power source 11 of the alarm device 1 is interrupted. Then, the read out circuit 5 inputs this fact to the alarm judging circuit 9, which operates both of the buzzer 16 and the LED 17, or at least the buzzer 16.

As mentioned above, since the trouble alarms of the particular sensor(s) 12 in trouble are restored when the power source is operated again, the operator can recognize the trouble again in the case where the outboard motor is used again while the particular sensor(s) 12 remain in the out of order state, so that the operator can properly deal with the trouble.

Furthermore, the deletion circuit 6 selectively deletes the trouble data stored in the memory circuit 4 at the same time the engine of the outboard motor is restarted. Therefore, after the troubles of the particular sensor(s) 12 have been repaired, eliminated, or restored the reset of the trouble data can be automatically performed without requiring any special operation. However, if the repair of the sensors 12 has not been finished yet, the trouble is at once recognized again by the sensor trouble judging circuit 3, and the buzzer 16 and the LED 17 issue the appropriate alarms.

Next, the flow of the control of this alarm device 1 will be described hereunder with reference to the flowcharts of FIG. 4 and FIG. 5.

Figure 4:
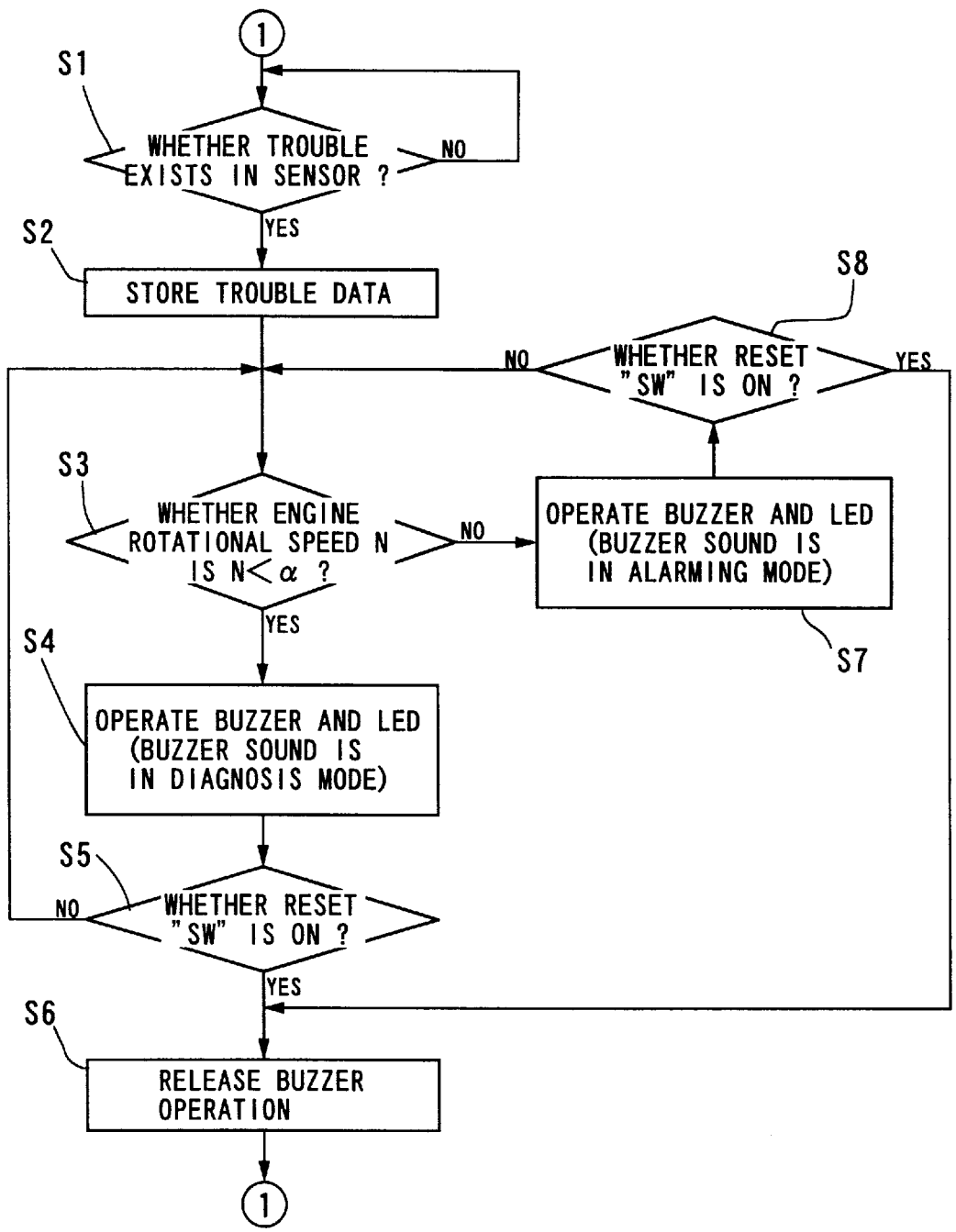
FIG. 4 shows a flowchart for controlling the alarm device during cruising of a boat to which the outboard motor is mounted.

The flow chart in FIG. 4 shows the flow of the control mode of the alarm device 1 during boat cruising (i.e, when the boat or the like, to which the outboard motor is mounted, is under way). In this control mode flow, after starting from the state ①, the alarm device 1 first determines or judges whether a sensor trouble is caused or not (step SI). In the case of a "NO" determination (i.e., indicating that no trouble exists), step S1 is repeated again. However, in the case of a "YES" determination (i.e., indicating that a trouble exists), an operation of a step S2 starts, and the trouble data is stored in the memory circuit 4.

In the next step, the alarm device 1 determines whether or not the engine rotational speed N is less than a predetermined rotational speed α at which the noise level becomes large (step S3). In the case of "YES" determination (i.e., N<α), then step S4 is performed, at which the buzzer 16 and the LED 17 are operated at the same time. The sound mode of the buzzer 16 is simultaneously set to the diagnosis mode. Based on control signals sent by the sensor trouble judging circuit 3, the tone of the buzzer 16 is selected according to the kind of sensor(s) 12 now in an out of order state.

In step S5, the alarm device 1 determines whether the reset switch 13 has been turned ON or not. In the case of a "YES" determination (i.e., indicating that the reset switch 13 has been turned ON), then step S6 is performed, at which the operation of the buzzer 16 is released and the step returns to ①. Further, at step S6, although the operation of the buzzer 16 is released, the operation of the LED 17 is not canceled, so that the LED 17 may remain in the turn-on state.

Further, in the case of a "NO" determination (i.e., indicating that reset switch 13 remains in the OFF condition) in step S5, then the alarm device 1 performs step S3, and the control modes after the step S3 are repeated. Accordingly, the buzzer 16 continues to sound in the diagnosis mode until the reset switch 13 is turned to the ON condition.

On the other hand, in the case of a "NO" determination (i.e., N<α) in step S3, then alarm device 1 performs step S7 during which the buzzer 16 is operated in the warning alarm mode, LED 17 is simultaneously turned on, and either the sound level of the buzzer 16 is increased relative to the diagnosis mode or the sound tone thereof is changed. In the next step S8, the operation (state) of the reset switch 13 is checked, and in the case of a "YES" determination (i.e., indicating that reset switch 13 is turned to the "ON" condition), the alarm device 1 performs step S6, at which the operation of the buzzer 16 is released. In the case of a "NO" determination (i.e., indicating that reset switch remains in an "OFF" condition), then alarm device 1 returns to step S3 at which the control modes after step S3 are repeated. In this case, the buzzer 16 also continues to sound in the alarming mode until the reset switch 13 is turned to the ON condition. Further, at this time, if the throttle of the engine is closed and the engine rotational speed N becomes less than α, the sound mode of the buzzer 16 changes to the diagnosis mode.

Thus, when a particular sensor(s) 12 break down (i.e., indicating that a particular type of trouble or problem exists), both buzzer 16 and the LED 17 are simultaneously operated, and further, the tone of the buzzer 16 is enlarged or is changed with the increase of the engine noise, so that the operator can be reliably alerted of the particular type of trouble. Moreover, because the tone of the buzzer 16 changes based on the particular type of sensor(s) 12 being in the out of order state, the operator can reliably recognize the type of the sensor(s) 12 in trouble so as to quickly and accurately deal with the trouble even if the operator is on board the outboard motor boat.

Figure 5:
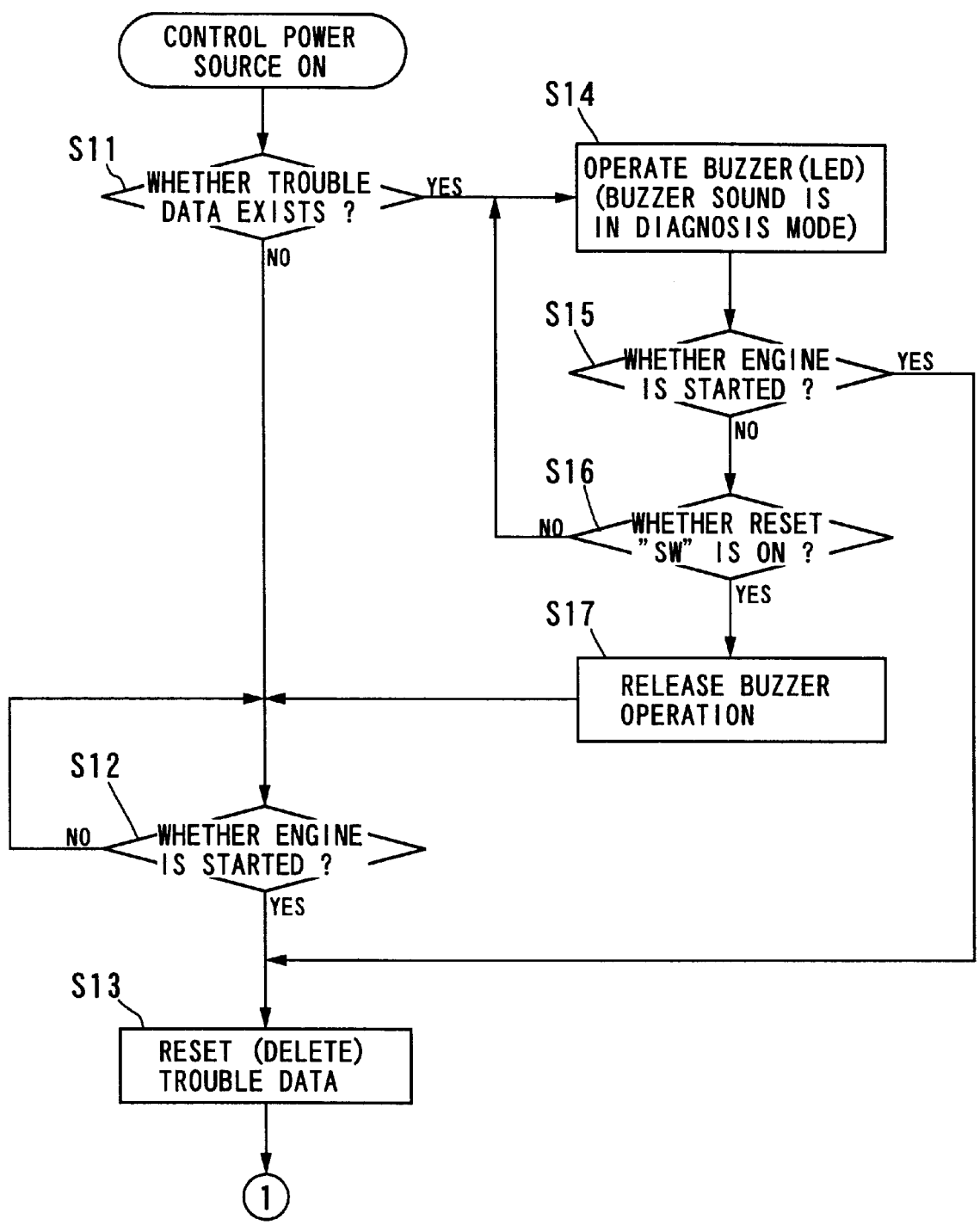
FIG. 5 shows a flowchart for controlling the alarm device after applying a control power from a power source to the alarm device.

On the other hand, the flowchart of FIG. 5 representing the flow of the control mode after the control power source 11 has been applied to the alarm device 1. In this control mode, in step S11, the alarm device 1 determines whether or not the trouble data is stored in the memory circuit 4. In the case of a "NO" determination (i.e., indicating that no trouble data exists), then alarm device 1 performs step S12, at which the start up of the engine is checked. In step S12, in the case of a "YES" determination (i.e., indicating that the engine already has been started), the trouble data is reset at step S13 (i.e., indicating that trouble data in memory circuit 4 has been deleted by the deletion circuit 6), and then the control mode returns to state ① of the flowchart illustrated in FIG. 4. Further, in step S11, in the case of a "NO" determination, the alarm device determines whether no trouble data exists in memory circuit 4, thereby rendering, it unnecessary to reset the trouble data in step S13.

Further, in the step S11, in the case of a "YES" determination (i.e., indicating that trouble data exists), then alarm device 1 performs step S14, at which both the buzzer 16 and the LED 17, or at least the buzzer 16, is operated. The sound mode pattern of the buzzer 16 at this time is set to the diagnosis mode, and further, the tone is selected according to the type of the sensor(s) 12 that are in the out of order state.

Thereafter, at step S15, the start up of the engine is checked In the case of a "NO" determination (i.e., indicating that the engine has not been started yet) the ON operation state of the reset switch 13 is checked at step S16. In the case of a "YES" determination (i.e., indicating that reset switch 13 has been turned ON), then alarm device 1 performs step S17, at which the operation of the buzzer 16 is canceled, and the control mode returns to step S12.

On the other hand, in step S15, in the case of a "YES" determination (i.e., indicating that the engine already has been started), then alarm device 1 performs step S13 to reset the trouble data. Further, in step S16, in the case of a "NO" determination (i.e., indicating that reset switch 13 is still in the OFF condition), then alarm device 1 returns to step S14 and the control modes of steps S14, S14, S16 are repeated. Accordingly, the buzzer 16 continues to sound until the reset switch 13 is turned to the ON condition.

Accordingly, as mentioned above, when one or more of the sensor(s) 12 break down, even if the power source is cut off, both the buzzer 16 and the LED 17, or at least the buzzer 16 is operated at the same time when the power source is restored, so that the operator can recognize the cause of the indicated trouble. This operation is continued until the repair of the portion in trouble has been finished. Hence, in such a case where the outboard motor is used with one or more of the sensor(s) 12 remaining in a trouble condition, the operator can recognize again the type of trouble or problem after power has been restored. When the repair of the trouble is finished, the trouble data can be reset by simply starting the engine without requiring any special operation.

Furthermore, in the alarm device 1 of this embodiment, although the buzzer 16 is used as the sound alarm means, and the LED 17 is used as the display alarm means, it is also possible to use a sound means other than the buzzer 16 and a display means other than the LED 17.

It is to be noted that the present invention is not limited to the described embodiment and many other changes and modifications may be made without departing from the scopes of the appended claims.

What is claimed is:

1. An alarm device of an outboard motor arranged in operative association with an engine of the outboard motor to which a sensor means including a plurality of sensors is mounted and operated by means of a control power source, said alarm device comprising:

a central control means into which an operation condition of the engine is inputted;

a sensor trouble judging means operatively connected to the central control means and the sensor means for judging a state of trouble of the sensor means;

an alarm control means;

a sound alarm means and a display alarm means controlled by the alarm control means;

an alarm judging means for judging a kind of an alarm, which is operatively connected to the alarm control means so as to operate the alarm control means to operate said sound alarm means in response to an information from the sensor trouble judging means at a time when the sensor means becomes out of order;

a memory means operatively connected to said sensor trouble judging means for storing trouble data of the sensor means; and a read-out means operatively connected to the memory means for reading out the trouble data stored in said memory means at a time when the control power source is operated again, wherein said alarm judging means includes means for detecting and comparing an engine rotational speed into which a predetermined engine rotational speed is preliminarily stored and a sound mode setting element to set a sound mode of the sound alarm means to a diagnosis mode when an engine rotational speed is less than a predetermined rotational speed and to set the sound mode to a warning alarm mode when the engine rotational speed exceeds said predetermined rotational speed with sound tones of the sound alarm means different in the diagnosis mode and the warning alarm mode, respectively.

2. An alarm device of an outboard motor according to claim 1, further comprising a deletion means for deleting the trouble data stored in said memory means at a time when the engine is started again.

3. An alarm device of an outboard motor according to claim 1, wherein said alarm control means is included in said alarm judging means and wherein a reset means is operatively connected to said alarm judging means for operating the alarm control means.

4. An alarm device of an outboard motor according to claim 1, wherein said sound alarm means is a buzzer.

5. An alarm device of an outboard motor according to claim 1, wherein said display alarm means simultaneously is operated with the sound alarm means, said display alarm means being a light emitting diode.

6. An alarm device of an outboard motor according to claim 1, further comprising a tone changing means, which is operated to select a tone of a sound generated by the sound alarm means according to a kind of sensor now in trouble when said sound alarm means is operated in the diagnosis mode and said tone changing means is included in said sensor trouble judging means.

7. An alarm device of an outboard motor according to claim 1, wherein at least the sound alarm means in said sound alarm means and display alarm means is operated in response to an information from said read-out means.

8. An alarm device of an outboard motor arranged in operative association with an engine of the outboard motor to which a sensor means including a plurality of sensors is mounted and operated by means of a control power source, said alarm device comprising:

a central control means into which an operation condition of the engine is inputted;

a sensor trouble judging means operatively connected to the central control means and the sensor means for judging a state of trouble of the sensor means;

an alarm control means including two kinds of control elements operatively independent from each other;

a sound alarm means and a display alarm means which are controlled independently by said two control elements, respectively; and an alarm judging means for judging a kind of an alarm, which is operatively connected to the alarm control means so as to operate the alarm control means to simultaneously operate said sound alarm means and display alarm means in response to an information from the sensor trouble judging means at a time when the sensor means becomes out of order;

a memory means operatively connected to said sensor trouble judging means for storing trouble data of the sensor means; and a read-out means operatively connected to the memory means for reading out the trouble data stored in said memory means at a time when the control power source is operated again, wherein said alarm judging means includes means for detecting and comparing an engine rotational speed into which a predetermined engine rotational speed is preliminarily stored and a sound mode setting element to set a sound mode of the sound alarm means to a diagnosis mode with a small loudness when an engine rotational speed is less than a predetermined rotational speed and to set the sound mode to a warning alarm mode with a large loudness when the engine rotational speed exceeds said predetermined rotational speed at the time when said sound alarm means and said display alarm means are simultaneously operated.

* * * * *